United States Patent [19]

Weiner

[11] Patent Number: 4,862,390

[45] Date of Patent: Aug. 29, 1989

[54] METHOD AND APPARATUS FOR SELECTION OF ONE FROM A PLURALITY OF ENTRIES LISTED ON A COMPUTER DISPLAY

[75] Inventor: Jonathan A. Weiner, Palo Alto, Calif.

[73] Assignee: Hewlett-Packard Company, Palo Alto, Calif.

[21] Appl. No.: 137,988

[22] Filed: Dec. 24, 1987

[51] Int. Cl.$^4$ ............................................ G06D 3/037
[52] U.S. Cl. .................................. 364/521; 340/710; 340/711
[58] Field of Search ................ 364/521; 340/709, 710, 340/711

[56] References Cited

U.S. PATENT DOCUMENTS

Re. 32,632  3/1988  Atkinson ............................ 340/709

OTHER PUBLICATIONS

Macintosh Plus, Program Documentation 1986, pp. 25–26.

*Primary Examiner*—Gary V. Harkcom
*Assistant Examiner*—Mark K. Zimmerman
*Attorney, Agent, or Firm*—Alan H. Haggard

[57] ABSTRACT

Apparatus and method for selecting entries within a plurality of entries. The preferred embodiment of the invention includes a search control processor which causes an edit box and a list box to be displayed on a display. In the list box is displayed a subset of entries from a plurality of entries. As letters are typed on a keyboard, the letters are displayed in the edit box. The search control processor causes a first entry from the plurality of entries to be highlighted when the first letter(s) of the first entry match the letters displayed in the edit box and when the first entry is in alphabetical order before any other entry from the plurality of entries whose first letter(s) match the letter(s) displayed in the edit box. When a user presses "ENTER" or some other designated key on the keyboard the search control processor selects the entry highlighted on the screen. Since often the list box is not sufficiently large to display all entries in the plurality of entries, when the first entry whose first letter(s) match the letters in the edit box is not displayed, the search control processor will cause the list box to scroll so that the first entry is displayed.

7 Claims, 9 Drawing Sheets

METHOD AND APPARATUS FOR SELECTION OF ONE FROM A PLURALITY OF ENTRIES LISTED ON A COMPUTER DISPLAY

BACKGROUND

The present invention relates to search control which give a user an improved way to make a selection using a key board and a display.

In certain computing systems, a user uses a mouse to move a cursor on a display screen. A button on the mouse is pushed to indicate the user's desire to make a selection.

For instance, FIG. 1, shows an example of what may appear on a display screen in the prior art. List of application names 3 appear enclosed in a selection box. A cursor 2 appears on the screen controlled by a mouse (not shown). When the mouse moves on a surface, the cursor moves on the screen. When a user wants to select one of applications 3 he moves the mouse such that cursor 2 is placed over his selection. The user then pushes a button on the mouse, which causes the selection to be highlighted. The user then moves cursor 2 to be within box 8, labelled Select. Once there the user again pushes the button on the mouse. The computer then acts upon the user's selection.

Alternatively, in order to make a selection, once a user has placed cursor 2 over a selection, some prior art systems allow a user to push the button twice in quick succession. Other systems may have two buttons on a mouse, one used for highlighting a selection, and one used for when a user finally wants to make a selection. Finally, in some systems, pushing a button on a mouse down may cause a selection to be highlighted. Releasing the button may cause the selection to be made.

Often times only a limited number of selections may be displayed at one time. For instance, in FIG. 1, only nine applications in alphabetical order are shown. However, a total list of the applications may be much larger. The other selections may be addressed by using scroll bar 4. Scroll bar 4 contains a scroll region 7, an arrow box 5 and an arrow box 6. In FIG. 1 scroll region 7 is at the border of arrow box 5. This indicates that the first entries of the list of applications are shown. When scroll region 7 is at the border of arrow box 6, this indicates that the last entries of the list of applications are shown. When scroll region 7 is in between these extreme positions, this indicates some intermediate entries of the list of applications are being shown.

Scroll region 7 may be moved by various methods. For instance, when scroll region 7 is not at the border of arrow box 6, a user may scroll down the shown list of applications by placing cursor 2 in arrow 6 and depressing a button on the mouse. Upon each depression of the button the top displayed entry disappears, a new bottom entry appears at the bottom and all the other selections move upward. Also, scroll region 7 moves incrementally downward. Similarly, placing cursor 2 in arrow 5 and depressing the button on the mouse causes the list of applications to be scrolled upward and scroll region 7 to be moved incrementally upward. Further, the list of applications may be scrolled by placing cursor 2 in scroll regions 7 and depressing the button on the mouse. The scroll region will then follow cursor 2 up and down scroll bar 4 until the button is released. Upon release, entries in the list of applications would appear which would correspond to the location of scroll region 7 on scroll bar 4.

As can be seen, the prior art method is a visual, easy to use method of selecting an entry from a list. Nevertheless, when a list of entries is very long, it may be inconvenient for a user to try and locate the exact entry. Further, many typists prefer to remove their fingers from the keyboard as seldom as possible. In the prior art method, however, it is necessary to use a mouse to make a selection.

SUMMARY OF THE INVENTION

In accordance with the preferred embodiment of the present invention, an improved apparatus and method for selecting entries within a plurality of entries is presented. The preferred embodiment of the invention includes a search control processor which causes an edit box and a list box to be displayed on a display. In the list box is displayed a subset of entries from a plurality of entries. As letters are typed on a keyboard, the letters are displayed in the edit box. The search control processor causes a first entry from the plurality of entries to be highlighted when the first letter(s) of the first entry match the letters displayed in the edit box and when the first entry in in alphabetical order before any other entry from the plurality of entries whose first letter(s) match the letter(s) displayed in the edit box. When a user presses "ENTER" or some other designated key on the keyboard the search control processor selects the entry highlighted on the screen.

Since often the list box is not sufficiently large to display all entries in the plurality of entries, when the first entry whose first letter(s) match the letters in the edit box is not displayed, the search control processor will cause the list box to scroll so that the first entry is displayed. Also if the first letter(s) of no entry from the plurality of entires matches the letter(s) in the edit box, the search control processor will cause the list box to be scrolled to the top of the list of entries, and depressing the "ENTER" key will have no effect. Alternately, depressing the "ENTER" key could result in an error message.

When there are a large number of entries in a list, the present invention allows a user to make a selection quickly, with a minimum amount of keystrokes. It is not necessary for his hands to leave the keyboard. Additionally, the visual display aids the user in determining that he has made a correct choice.

DESCRIPTION OF THE PREFERRED EMBODIMENT

Figure 2A:
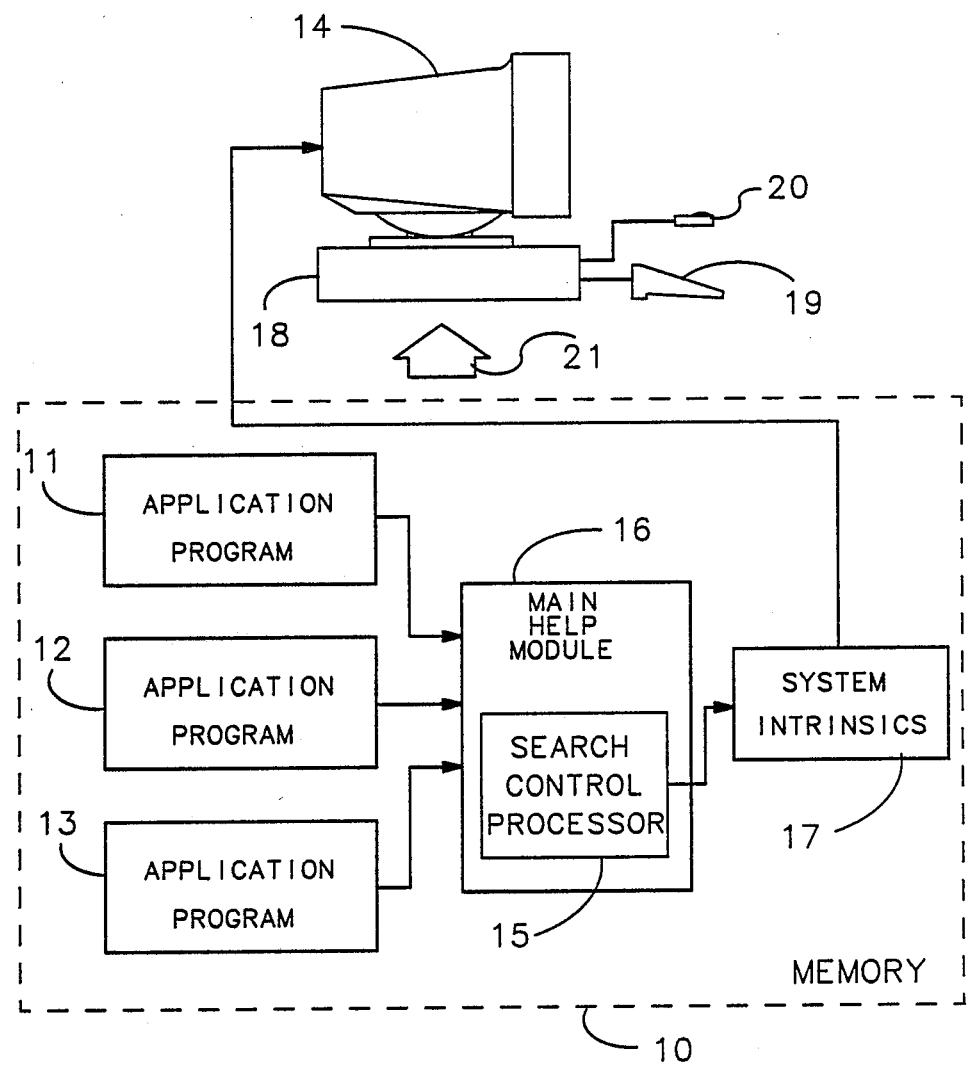
FIG. 2A shows a block diagram of a computing system in accordance with the preferred embodiment of the present invention.

FIG. 2A shows a computing system in accordance with the preferred embodiment of the present invention. A monitor 14, a mouse 20 and a keyboard 19 are coupled to a computer 18. A memory 10 is resident within computer 18 as represented by arrow 21.

Memory 10, may, for example, contain an applicaton program 11, an application program 12, an application program 13, a main help module 16 and system intrinsics 17.

Application programs 12, 13 and 14 call a main help module 16. Within main help module is a search control processor 15. Search control processor 15 utilizes system intrinsics 17 to display a selection box 30 shown in Figures 3 through 7.

An example of code embodying search control processor 15 is attached hereto as Appendix A. The code is written in the "C" programming language and calls system intrinsics 17. System intrinsics 17 may be routines within an operating system such as Windows, available from Microsoft Corporation, having a business address at 16011 NE 36th Way, Redmond, WA 98073-9717.

Figure 2B:
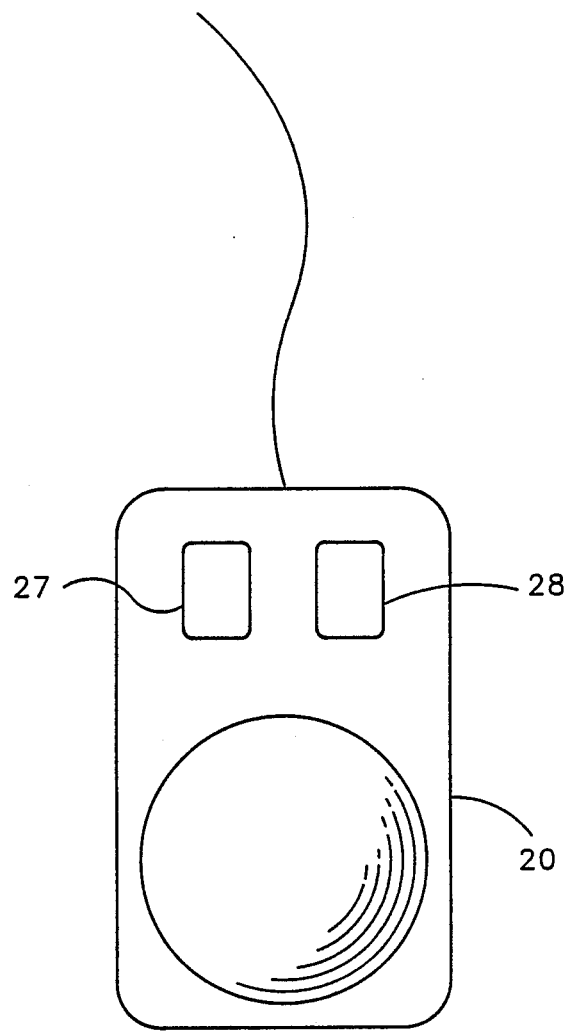
FIG. 2B shows a mouse in accordance with the preferred embodiment of the present invention.

FIG. 2B shows a top view of mouse 20. Mouse 20 includes a button 27 and a button 28.

Figure 3:
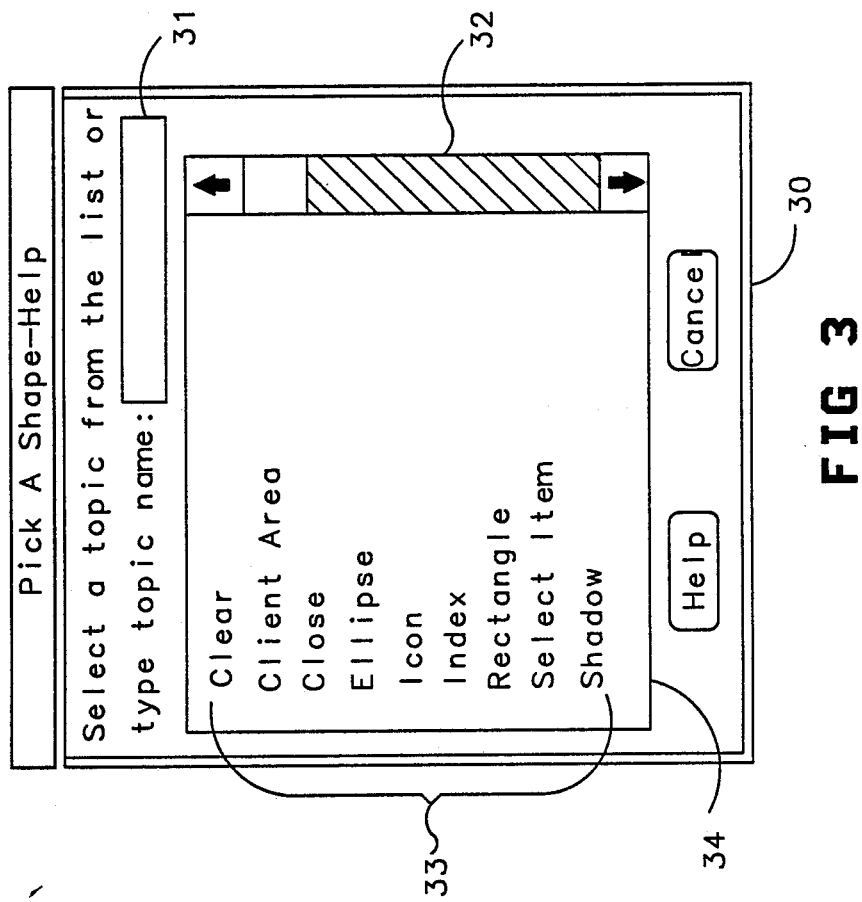
FIGS. 3 through 7 shows display which illustrate how selections may be made in accordance with the preferred embodiment of the present invention.

FIG. 3 shows selection box 30 as displayed on display 14. Within selection box 30 is a list box 34. Within list box 34 selection entries 33 are displayed. In the present embodiment, each entry from selection entries 33 describes a topic which for which a "help" program will provide information on. Thus, for instance, a user can get information on icons by selecting the entry from the selection of displayed entries 33 which says 'Icon'.

Figure 1:
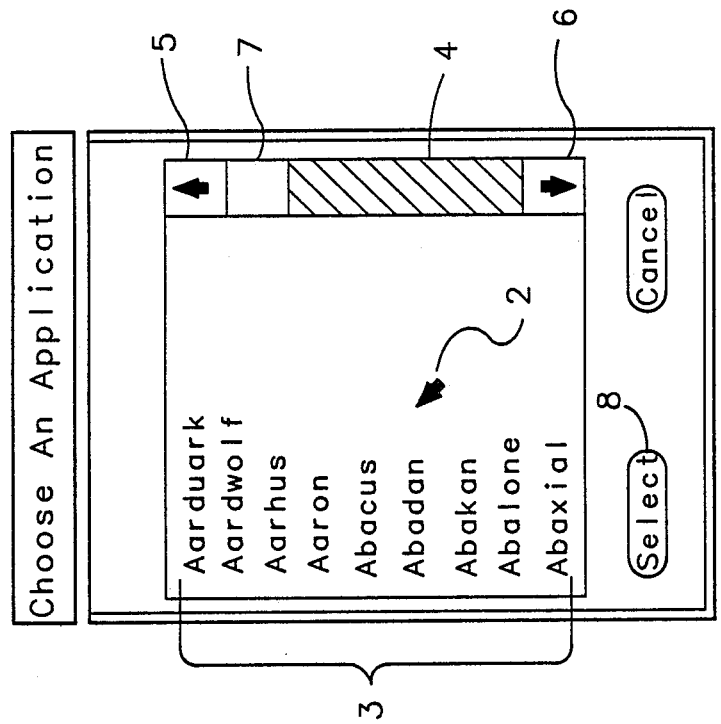
FIG. 1 is a block diagram of a display demonstrating a prior way of selecting an entry from a list of entries.

In this preferred embodiment, selection of entries using a mouse may be done in the way described in the discussion of Prior Art of FIG. 1. As in FIG. 1, a scroll bar 32 may be used in the selection process.

In FIG. 3, there is additionally included an edit box 31. Edit box 31 may be used to type in the name of the selection. This allows the user to make a selection using keyboard 19, and without using mouse 30. For instance, rather than using a mouse to select the entry labelled "Close", a user could, using keyboard 19, type in the letters "c" "1" "o" "s" "e". The word "close" appear in edit box 31. Upon pressing "ENTER" on keyboard 19, search control processor 15 would cause the entry "Close" to be selected. As explaiend below, although a user may completely spell out "c" "1" "o" "s" "e", in the preferred embodiment of the present invention, it is not necessary to type in all the letters. As will be made clear from the following discussion, typing in the letters "c" "1" "o" followed by pressing "ENTER" is sufficient to select the entry "Close".

Figure 4:
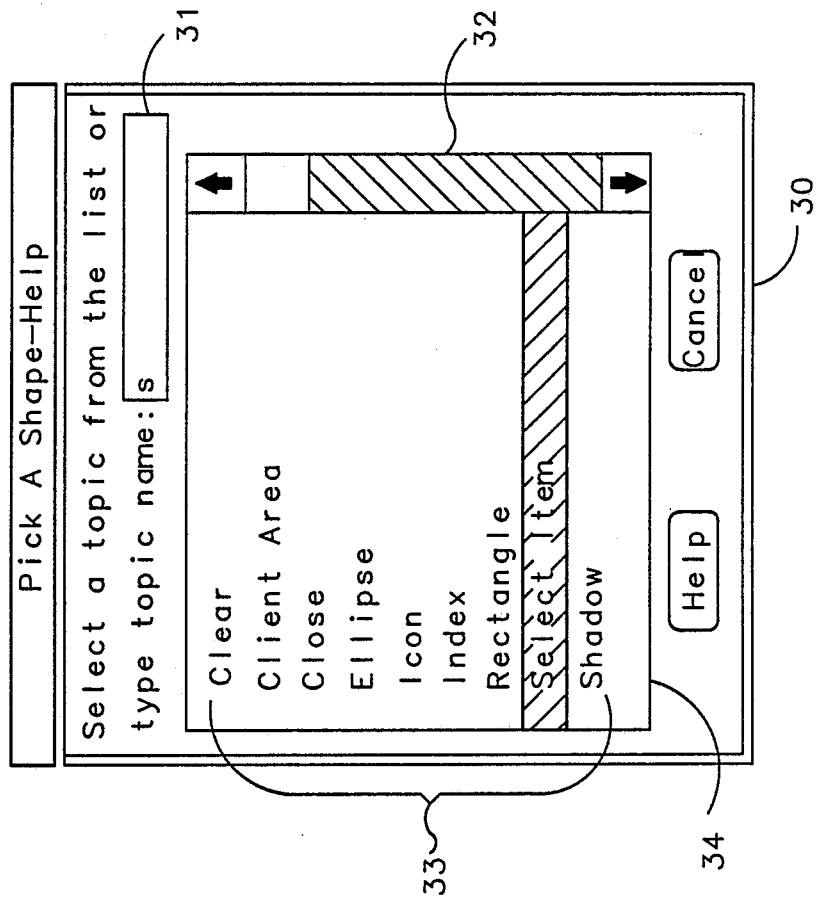

Letters typed into edit box 31 also interacts with displayed entries 33 in list box 34 to allow for a shorthand method to select entries. When a first letter is typed into edit box 31, search control processor 15 causes the first selection in list box with the same first letter to be highlighted. For instance, if the letter "s" is typed in edit box 31, the entry "Select Item" would be highlighted, as is shown in FIG. 4. If a user presses "ENTER" on keyboard 19, search control processor 15 will cause the entry "Select Item" to be selected.

Figure 5:
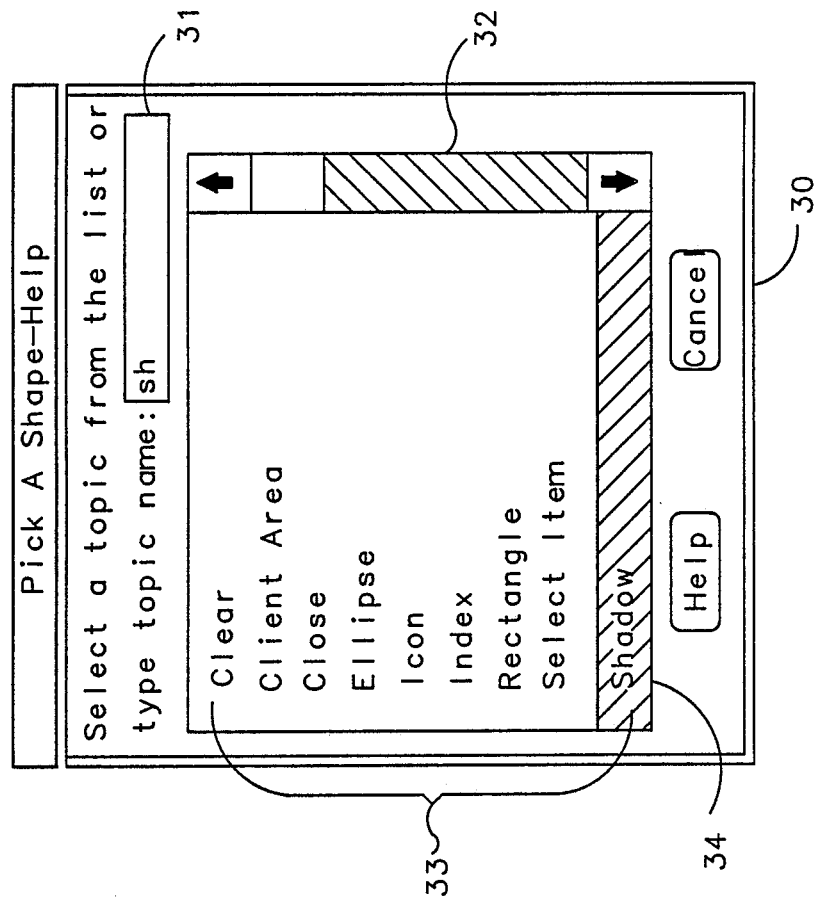

If instead the user types another letter, search control processor 15 causes the first entry in list box 34 with the same first two letters to be highlighted. For instance, if the user typed in the letter "e", the entry "Select Item" would remain highlighted. If, instead, the user typed in the letter "h", the entry "Shadow" would be highlighted, as shown in FIG. 5. If the user now presses "ENTER" on keyboard 19, search control processor 15 will cause the entry "Shadow" to be selected.

This process continues for every letter typed into edit box 31. If at this point the user presses "BACKSPACE" on keyboard 19, the "h" will disappear from edit box 31. Additionally, the highlighting in list box 34 will match the entry in edit box 31, so that the entry "Shadow" will no longer be highlighted, but instead the entry "Select Item" will be highlighted, as shown in FIG. 4. If the user presses "ENTER" on keyboard 19, search control processor 15 will cause the entry "Select Item" to be selected.

Figure 6:
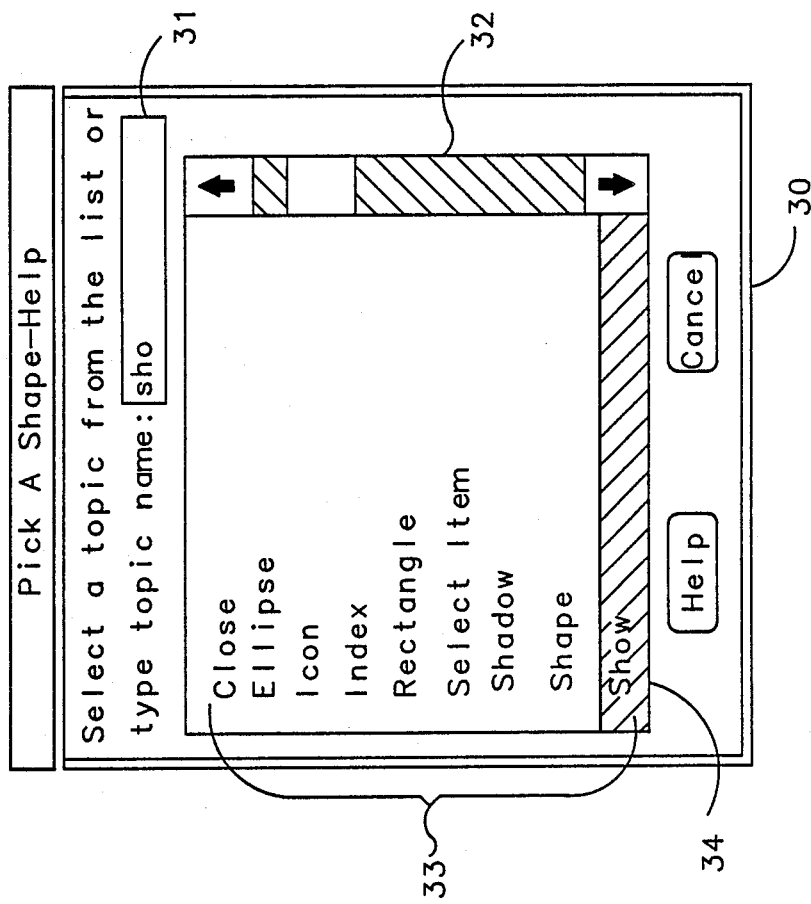

If the list of entries is larger than may be displayed within list box 34, this does not prevent non-displayed entries from being selected. Search control processor 15 will continue to search through non-displayed entries looking for a match. If a match is found search control processor 15 will scroll displayed entries 33 to display the entry that matches. For instance, if edit box 31 were to contains the letters "sh" as shown in FIG. 5, and the user additionally types in the letter "o" search control processor 15 will scroll down to highlight an entry "Show" as shown in FIG. 6.

Figure 7:
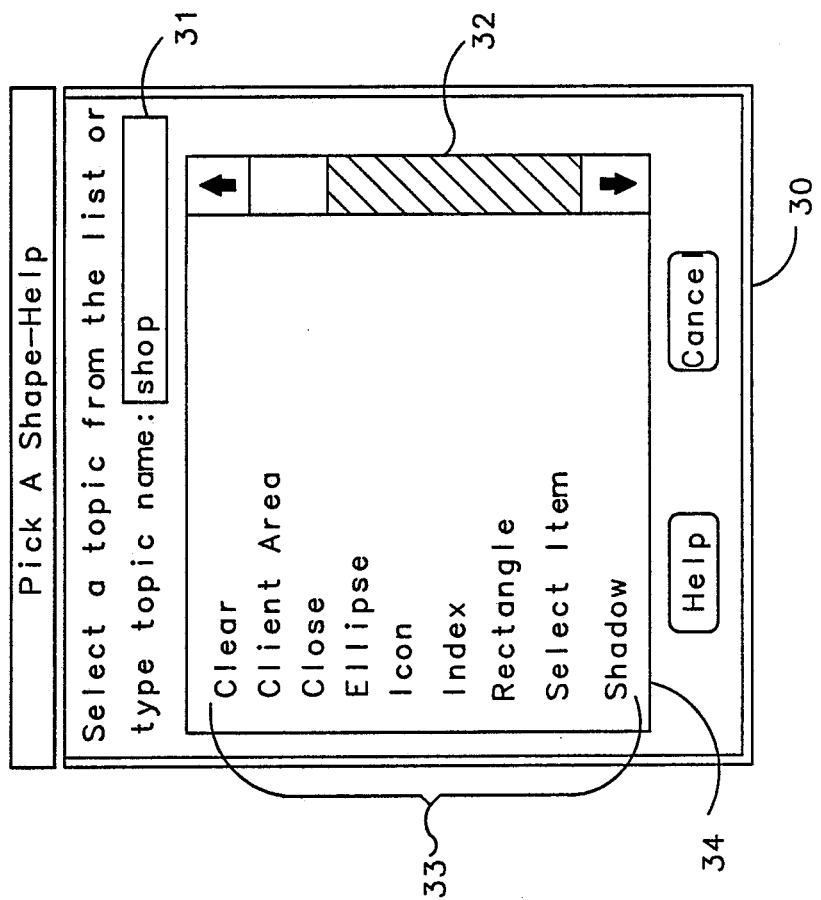

If there is no entry that matches, search control processor 15 will scroll list box 34 to the top of the list of entries and no entries will be highlighted. For instance, if edit box 31 contains "sho" as in FIG. 6, and the user additionally types the letter "p", search control processor 15 will find no match, that is there is no entry which starts with the letters "shop". Therefore, search control processor 15 will scroll to the top of the list as shown in FIG. 7. If the user presses 'ENTER' nothing will happen. An alternate embodiment could allow for an error message to be displayed.

Figure 8:
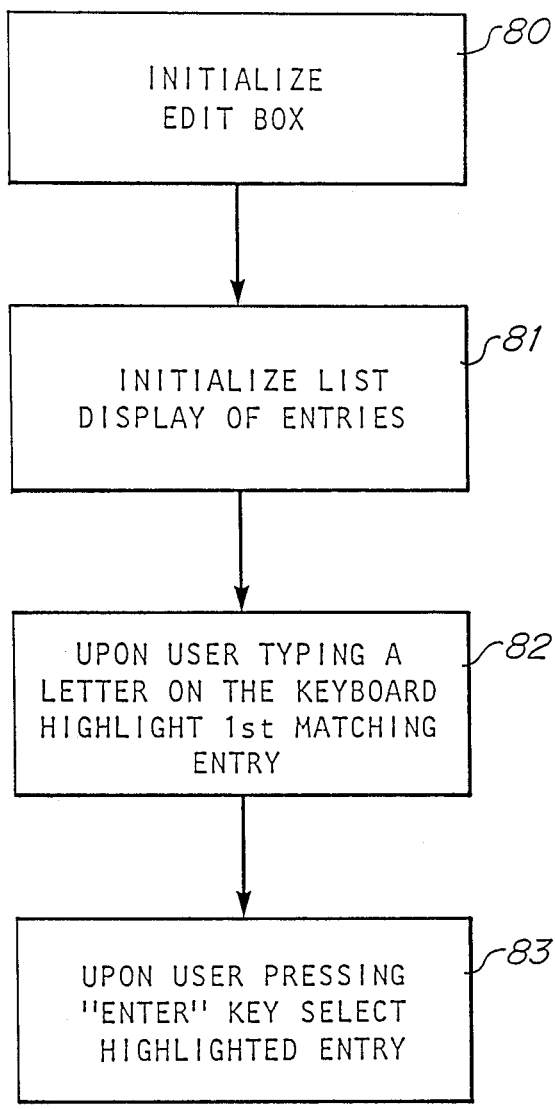
FIG. 8 is a simplified flowchart of a search control processor in accordance with the preferred embodiment of the present invention.

FIG. 8 is a simplified flowchart showing the logical functioning of search control processor 15. In a step 80, search control processor 15 initializes edit box 31. This may be done using one of system intrinsics 17, for example, Windows predefined class "EditBox".

In a step 81 search control processor initializes entries 33 within selection box 30. This may be done using one of system intrinsics 17, for example, Windows predefined class 'SendMessage'.

In a step 82, upon a user typing a letter on keyboard 19, search control processor 15 highlights the entry from entries 33 which is in alphabetical order first among those entries from entries 33 whose first letters match the letters within edit box 31. This may be implemented as set out in Appendix A (see "case IDEDITBOX").

In a step 83, upon a user pressing the "ENTER" key upon keyboard 19, search control process 15 selects the entry from entries 33 which is highlighted. This may be implemented as set out in Appendix A (see "case IDOK"). v,10/120

I claim:

```
IndexCmd - processes command messages from the dialog box.
       Returns the value of the listbox item selected.
*/
VOID IndexCmd (hDlg, wParam, lParam)
HWND hDlg;
WORD wParam;
LONG lParam;
{
```

```
char        pSearchStr[MAXLEN];
int         nCurSelection;
PSTR        *pStrings;        /* pointer to the pointers */
int         index_num, strlen;
PSTR        ret_val;
char        pStr[MAXLEN];

switch (wParam) {
    case IDEDITBOX:
        if (bSetEditText == TRUE)      /* Has the edit box text already been set? */
        {                              /* If so, don't search for a match */
            bSetEditText = FALSE;
            break;
        }
        /* see if anything has changed, like a character typed in */
        if (HIWORD (lParam) == EN_CHANGE )
        {
            strlen = SendMessage (hEditBox, WM_GETTEXTLENGTH, 0, 0L);  /* Get the length of the text in the edit box */
            if (strlen == 0)                                            /* If the length is 0, don't select an entry */
                SendMessage (hListBox, LB_SETCURSEL, -1, 0L);
            else
            {
                GetWindowText( hEditBox, (LPSTR)pSearchStr, MAXLEN);    /* get the text from the editbox */
                pStrings = pindexStrTable;
                for (index_num = 0; (index_num < nIndexLen) && **pStrings;
                     index_num ++, pStrings ++)                         /* Search through the index for a match */
                {
                    strcpy (pStr, *pStrings);                           /* copy index string to temp buffer */
                    AnsiUpper (pStr);                                   /* convert both strings to same case for compare */
                    AnsiUpper (pSearchStr);
                    ret_val = strstr (pStr, pSearchStr);
                    if ( (ret_val == pStr) ||
                         ( (ret_val == &pStr[2]) && (pStr[0] == ' ') ) )  /* also need to check for indent matches */
                    {
                        SendMessage (hListBox, LB_SETCURSEL, index_num, 0L);
                        break;
                    }
                } /* for */
                /* if all the index strings were checked, there was no match found */
                if ( (**pStrings==0) || (index_num >= nIndexLen) )
                    SendMessage (hListBox, LB_SETCURSEL, -1, 0L);
            } /* else */
        }
        break;

case IDOK:
        /* if the OK button is enabled by a valid listbox   */
        /* then accept the string, and shutdown the box     */
        if (IsWindowEnabled( hOk) ) {
            nPrevSelection = LOWORD( SendMessage( hListBox,
                                     LB_GETCURSEL, 0, 0L));
            nPrevScroll = GetScrollPos( hListBox, SB_VERT);
            ShutDownIndex (hDlg, nPrevSelection);
        }
        break;

case IDLISTBOX:
        switch (HIWORD (lParam)) {
            case LBN_DBLCLK:
                PostMessage( hDlg, WM_COMMAND, IDOK, 0L);
                break;

/* if the listbox highlight moved, then put get the
             * new listbox string and put it in the edit box. Note
             * that you will receive a SELCHANGE message if the user
             * clicks below the last listbox string, thus the check
             */
            case LBN_SELCHANGE:
                nCurSelection = LOWORD( SendMessage (hListBox,
                                        LB_GETCURSEL, 0, 0L));
                if (nCurSelection != LB_ERR)    /* 10-28-87 */
                {
                    SendMessage( hListBox, LB_GETTEXT, nCurSelection,
                                 (LONG)(LPSTR)pSearchStr);
                    /* set this flag before the call to SetWindowText,
                       because the call generates a message. */
                    bSetEditText = TRUE;
                    SetWindowText( hEditBox, (LPSTR)pSearchStr);
                }
                else
                    SetWindowText (hEditBox, (LPSTR)"");
                break;

default:
                break;
        }
        break;

/* This is the End Help button */
    case IDCANCEL:
        ShutDownIndex( hDlg, (WORD)NO_TOPIC);
        break;

default:
        break;
}

/* If there is something selected in the listbox,  */
/* then enable the OK button                       */
EnableWindow( hOk, SendMessage( hListBox, LB_GETCURSEL, 0, 0L) != LB_ERR);
}
```

1. In a computing system having a keyboard, a search control program and a display, a method for allowing a user from a keyboard to select a selected entry from a plurality of entries, the method comprising the steps of:
    (a) displaying in a first region on the display letters typed in by the user on the keyboard;
    (b) displaying in a second region on the display a first subset of the plurality of entries;
    (c) highlighting on the display, at the direction of the search control program, a first entry whose first letter(s) match the letter(s) displayed in the first region when the search control program determines the first entry is in alphabetical order first among entries from the plurality of entries whose first letter(s) match the letter(s) displayed in the first region; and, (d) making, at the direction of the search control program, the first entry the selected entry when the search control program determines that the user has pressed a designated key on the keyboard;

(e) displaying the first subset of the plurality of entries in the second region, highlighting no entry, and making the selected entry equal to a null set when the search control program determines that the first letter(s) of no entry in the plurality of entries match the letter(s) displayed in the first region.

2. A method as in claim 1, wherein step (c) additionally comprises the following substep:

(c1) displaying in the second region, instead of the first subset of the plurality of entries, a second subset of the plurality of entries which includes the first entry when the search control program determines that the first entry is not in the first subset of the plurality of entries.

3. In a computing system having a display and a keyboard, an apparatus for selecting a selected entry from a plurality of entries, the apparatus comprising:

display control means coupled to the display for displaying things on the display; and, search control processor means, coupled to the display control means and responsive to the keyboard, for causing the display control means to display information and for allowing the selection of the selected entry, the search control processor means including edit box means for causing the search control processor to display in a first region of the display, letters typed in on the keyboard, list display means, for causing the search control processor to display in a second region of the display, in alphabetical order, a first subset of the plurality of entries, highlight means for causing the search control processor to highlight on the display a first entry displayed in the second region when the search control processor means determines the first letter(s) in the first entry match the letter(s) displayed in the first region when the first entry is in alphabetical order first among entries from the plurality of entries whose first letter(s) match the letter(s) displayed in the first region;

selection means for making the first entry the selected entry when the search control processor means determines a designated key on the keyboard is pressed;

means for causing the display control means to display the first subset of the plurality of entries in the second region and highlighting no entry when the first control processor means determines the first letter(s) of no entry in the plurality of entries match the letter(s) displayed in the first region; and, means for making the selected entry equal to a null set when the first control processor means determines the first letter(s) of no entry in the plurality of entries match the letter(s) displayed in the first region.

4. An apparatus as in claim 3 wherein the highlight means additionally comprises means for causing the display control means to display in the second region a second subset of the plurality of entries when the search control processor means determines the first entry is not in the first subset of the plurality of entries.

5. In a computing system having a keyboard, a search control program and a display, a method for allowing a user from a keyboard to select a selected entry from a plurality of entries, the method comprising the steps of:

(a) displaying in a first region on the display letters typed in by the user on the keyboard;

(b) displaying in a second region on the display a first subset of the plurality of entries;

(c) highlighting on the display, at the direction of the search control program, a first entry whose first letter(s) match the letter(s) displayed in the first region when the search control program determines the first entry is in alphabetical order first among entries from the plurality of entries whose first letter(s) match the letter(s) displayed in the first region; and, (d) deleting from the second region the last letter displayed in the second region upon the user pressing a first designated key on the keyboard.

(e) highlighting on the display, at the direction of the search control program, a second entry whose first letter(s) match the letter(s) displayed in the first region when the search control program determines the second entry is in alphabetical order first among entries from the plurality of entries whose first letter(s) match the letter(s) displayed in the first region; and, (f) making, at the direction of the search control program, the second entry the selected entry when the search control program determines that the user has pressed a second designated key on the keyboard.

6. A method as in claim 5 additionally comprising the step of:

(g) displaying the first subset of the plurality of entries in the second region, highlighting no entry, and making the selected entry equal to a null set when the search control program determines that the first letter(s) of no entry in the plurality of entries match the letter(s) displayed in the first region.

7. A method as in claim 5, wherein step (c) additionally comprises the following substep:

(c1) displaying in the second region, instead of the first subset of the plurality of entries, a second subset of the plurality of entries which includes the first entry when the search control program determines that the first entry is not in the first subset of the plurality of entries.

* * * * *

UNITED STATES PATENT AND TRADEMARK OFFICE
CERTIFICATE OF CORRECTION

PATENT NO. : 4,862,390
DATED : August 29, 1989
INVENTOR(S) : Jonathan A. Weiner

It is certified that error appears in the above-identified patent and that said Letters Patent is hereby corrected as shown below:

Column 4,
Line 61, after "IDOK")." delete "v, 10/120"

Signed and Sealed this

Twelfth Day of April, 2005

JON W. DUDAS
*Director of the United States Patent and Trademark Office*